United States Patent [19]
Baba et al.
[11] Patent Number: 4,839,120
[45] Date of Patent: Jun. 13, 1989

[54] CERAMIC MATERIAL EXTRUDING METHOD AND APPARATUS THEREFOR

[75] Inventors: Toshio Baba, Owariasahi; Hajime Matsushita, Nagoya; Yasuji Katsuragawa, Okazaki, all of Japan
[73] Assignee: NGK Insulators, Ltd., Japan

[21] Appl. No.: 156,885
[22] Filed: Feb. 18, 1988
[30] Foreign Application Priority Data
Feb. 24, 1987 [JP] Japan ........ 62-39242
[51] Int. Cl.[4] ........ B28B 3/24; B28B 21/52; B29B 7/84
[52] U.S. Cl. ........ 264/102; 264/151; 264/177.11; 264/177.12; 425/197; 425/199; 425/202; 425/203; 425/205; 425/461; 425/467
[58] Field of Search ........ 264/102, 148, 151, 177.11, 264/177.12, 209.8, 211.11; 425/197, 198, 199, 203, 202, 204, 205, 209, 461, 464, 467

[56] References Cited

U.S. PATENT DOCUMENTS

| | | | |
|---|---|---|---|
| 2,572,063 | 10/1951 | Skipper | 264/102 X |
| 2,617,167 | 11/1952 | Johnson | 264/102 |
| 3,390,216 | 6/1968 | Umeya et al. | 264/102 |
| 3,790,654 | 2/1974 | Bagley | 264/177.11 |
| 3,836,302 | 9/1974 | Kaukeinen | 425/197 |
| 3,888,963 | 6/1975 | Orso et al. | 264/211.11 |
| 3,900,546 | 8/1975 | Kaukeinen | 264/102 |
| 4,178,145 | 12/1979 | Hamamoto et al. | 425/199 |
| 4,343,604 | 8/1982 | Minjolle | 425/461 X |
| 4,349,329 | 9/1982 | Naito et al. | 425/461 |
| 4,362,495 | 12/1982 | Naito et al. | 425/461 X |
| 4,550,005 | 10/1985 | Kato | 264/177.12 |

FOREIGN PATENT DOCUMENTS

| | | | |
|---|---|---|---|
| 789983 | 7/1968 | Canada | 425/467 |
| 2244452 | 3/1974 | Fed. Rep. of Germany | 425/205 |
| 48-43261 | 12/1973 | Japan | 425/197 |
| 51-73008 | 6/1976 | Japan | 425/467 |
| 60-124232 | 7/1985 | Japan | 425/205 |
| 61-64422 | 4/1986 | Japan | 425/205 |
| 61-169208 | 7/1986 | Japan | 425/205 |

OTHER PUBLICATIONS

Webster's Ninth New Collegiate Dictionary, Merriam-Webster Inc., Springfield, MA. 1985), p. 671.

*Primary Examiner*—Jeffery Thurlow
*Assistant Examiner*—Leo B. Tentoni
*Attorney, Agent, or Firm*—Arnold, White & Durkee

[57] ABSTRACT

A method of extruding a ceramic batch supplied from a vacuum auger machine into a formed body by a plunger molding machine, included the steps of loosening and crushing a supplied ceramic batch in the vacuum auger machine, extruding the loosened and crushed ceramic batch from the vacuum auger machine into a formed columnar body which is of a size able to be inserted into a cylinder of the plunger molding machine, and extruding the formed columnar body from the plunger molding machine to form a formed body of a predetermined shape. An apparatus for extruding a ceramic batch includes a vacuum auger machine having of a vacuum kneading section for kneading a ceramic material to produce a ceramic batch, a columnar body forming section for forming the kneaded ceramic material into a columnar body, and a batch transfer section having an auger for transferring the ceramic batch to the columnar body forming section. The apparatus further includes a grid drum having a grid provided on an exit side of the batch transfer section for loosening and crushing the ceramic batch kneaded in the vacuum kneading section before transferring the ceramic batch into the columnar body forming section.

7 Claims, 3 Drawing Sheets

CERAMIC MATERIAL EXTRUDING METHOD AND APPARATUS THEREFOR

BACKGROUND OF THE INVENTION

This invention relates to a method of extruding a ceramic material suitable for extrusion-forming of ceramic bodies, particularly ceramic honeycomb structures and an apparatus for use in the method.

In the past, in order to form ceramic bodies by extrusion-forming, a ceramic material is formed by means of a vacuum auger machine into circular cylinders or columnar bodies which are then supplied to an extrusion-forming apparatus such as a plunger molding machine to obtain ceramic bodies formed in predetermined shapes. The vacuum auger machine comprises a vacuum kneading section for kneading the ceramic material to obtain ceramic batches for forming ceramic bodies, a columnar body forming section for forming columnar bodies and a batch transferring section which transfers the ceramic batches obtained in the vacuum kneading section to the columnar body forming section by means of augers.

In such a hitherto used extrusion-forming method, ceramic batches obtained from the vacuum auger machine are directly extruded and formed by the extrusion-forming apparatus into desired shapes. In other words, even if laminations occur in the ceramic batches in being transferred by augers, the ceramic batches including the laminations are extruded to be formed without being rejected. As a result, when formed columnar bodies of the ceramic batches including such laminations are directly extruded by the plunger molding machine to obtain formed bodies in desired shapes, local deformations as defects would occur in the bodies after forming by the plunger molding machine or after firing the formed bodies. These defects are particularly acute in forming ceramic honeycomb structures whose grids are locally deformed, for example, waved in longitudinal directions of through-apertures or to form trapezoid cells deviated from, for example, square cells. As a result, when a catalyst is carried by such a honeycomb structure having the defects, through-apertures of the structure are often clogged in use.

U.S. Pat. No. 3,888,963 discloses a batch flow unifying device arranged immediately before a forming die of an extrusion-forming apparatus to eliminate unevenness in centers and outer circumferences of batches to be supplied to the forming die, in order to obtain uniformly formed bodies. However, it only serves to eliminate unevennesses in batches in a cylinder and does not solve the problem of the laminations above described.

SUMMARY OF THE INVENTION

It is a principal object of the invention to provide a ceramic material extruding method and an apparatus for carrying out the method, which eliminate all the disadvantages in the prior art as above described and which prevent any laminations in ceramic batches to be formed and hence deformations of formed bodies, particularly deformations of cells of ceramic honeycomb structures.

In order to achieve the object, the method of extruding a ceramic batch supplied from a vacuum auger machine into a formed body by a plunger molding machine according to the invention comprises steps of loosening and crushing a supplied ceramic batch in the vacuum auger machine, extruding the loosened and crushed ceramic batch from said vacuum auger machine into a formed columnar body which is in size able to be inserted into a cylinder of the plunger molding machine, and extruding said formed columnar body from said plunger molding machine to form a formed body of a predetermined shape.

Moreover, the apparatus for extruding a ceramic batch according to the invention comprises a vacuum auger machine consisting of a vacuum kneading section for kneading a ceramic material to produce a ceramic batch, a columnar body forming section for forming the kneaded ceramic material into a columnar body, and a batch transfer section having an auger for transferring said ceramic batch to the columnar body forming section, and a grid drum having a grid provided on an exit side of said batch transfer section for loosening and crushing the ceramic batch kneaded in said vacuum kneading section before transferring the ceramic batch into the columnar body forming section.

With the above arrangement, a ceramic batch supplied from the kneading section of the vacuum auger machine is loosened and crushed by means of the grid drum and then extruded by means of a plunger molding machine to form a formed body of a predetermined shape. Therefore, it is possible to prevent laminations which would occur in formed columnar body to be supplied into the plunger molding machine, thereby preventing deformations of the formed body of the predetermined shape.

The grid of the grid drum is preferably honeycomb-shaped or concentrically circular or of combinations thereof. Such shapes of the grid are advantageous in loosening and crushing ceramic batches. As laminations are apt to occur at centers of ceramic batches, the grid which is denser at its center is more preferable. Moreover, a grid having a streamline cross-section is preferable in order to decrease resistance of ceramic batches flowing through the grid.

The invention will be more fully understood by referring to the following detailed specification and claims taken in connection with the appended drawings.

DESCRIPTION OF THE PREFERRED EMBODIMENTS

Figure 1:
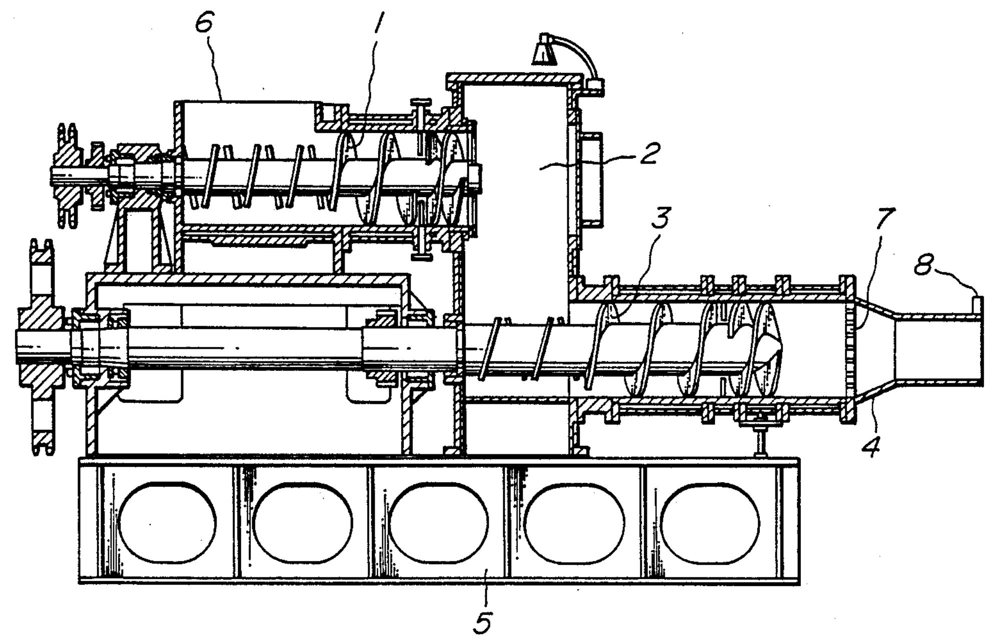
FIG. 1 is a partial sectional view illustrating an apparatus for use in carrying out the ceramic material extruding method according to the invention.
Figure 2A:
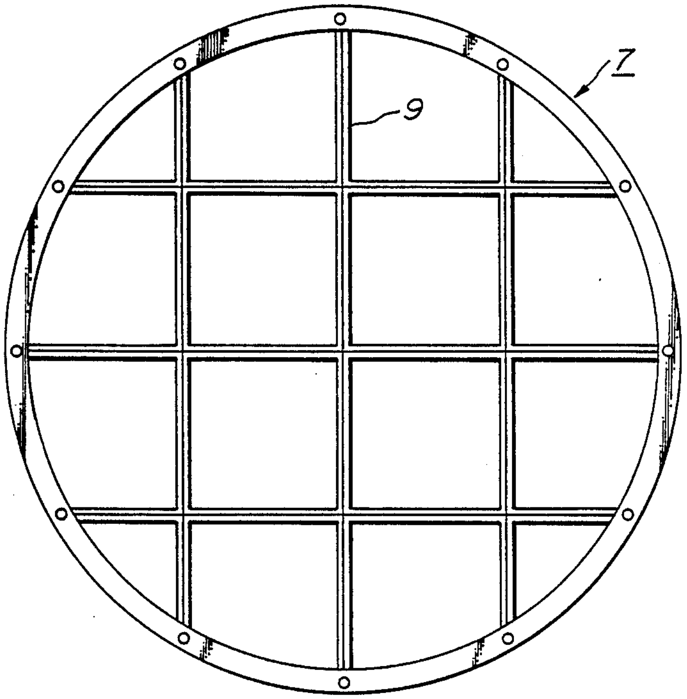
FIGS. 2*a* and 2*b* are a front view and a sectional view of one embodiment of the grid drum used in the apparatus according to the invention.
Figure 2B:
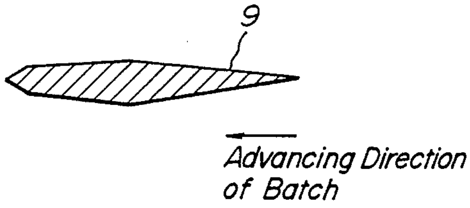
Figure 3A:
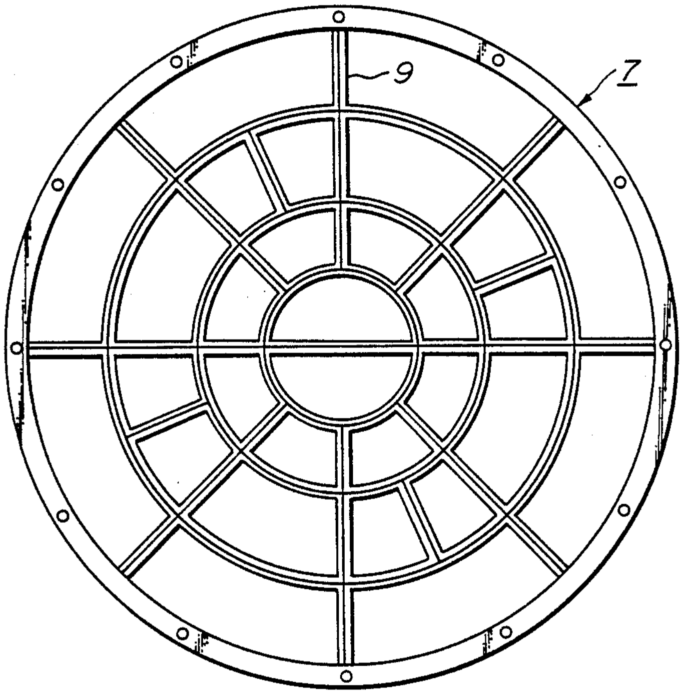
FIGS. 3*a* and 3*b* are a front view and a sectional view of another embodiment of the grid drum.
Figure 3B:
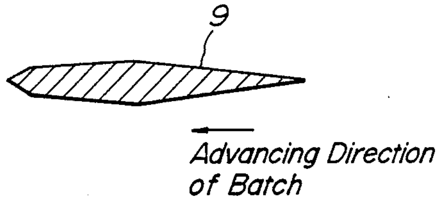

FIG. 1 is a partial sectional view of one embodiment of an apparatus for use in the ceramic extruding method according to the invention. The apparatus shown in FIG. 1 comprises a vacuum kneading section consisting of a screw type mill 1 and a vacuum chamber 2 for kneading a ceramic material to obtain a ceramic batch for forming a ceramic body, and a columnar body forming section consisting of a batch transfer section having an auger 3 for transferring the ceramic batch in the vacuum chamber 2 and a forming column ring 4 for forming the ceramic batch transferred by the auger into a circular cylinder or columnar body. The vacuum kneading section and the column body forming section are arranged on a frame 5.

The screw type mill 1 serves to transfer the ceramic material supplied through a material supply opening 6 into the vacuum chamber 2 while the material is being kneaded. Air bubbles in the ceramic batch kneaded and supplied into the vacuum chamber are removed in the vacuum chamber 2. The ceramic batch falls in the vacuum chamber by gravity onto the bottom of a shaft of the auger so as to be loosened and transferred into the batch transfer section.

The ceramic batch supplied into the batch transfer section is transferred by the auger 3, while being compressed. Then, the batch passes through a grid drum 7 provided on an exit side of the transfer section so as to be finely loosened and crushed, thereby removing any laminations. Thereafter, the ceramic batch devoid of laminations is formed into a formed circular cylinder or columnar body in the forming column ring 4. The thus obtained columnar body is cut in a predetermined length by means of a cutting machine 8 provided on an exit side of the forming columnar ring 4. The cut columnar body is supplied into a plunger molding machine (not shown) for a next process. In this case, it is required for the columnar body to have a diameter and a length enabling it to be inserted into a cylinder of the machine. Any plunger molding machines publicly known may be used for this purpose.

FIGS. *2a* and *2b* and *3a* and *3b* are plan and sectional views illustrating examples of grid drums to be used in the apparatus according to the invention. In the embodiment shown in FIGS. *2a* and *2b*, a grid 9 of a grid drum 7 is in the form of honeycomb. A section of the grid 9 is streamlined from the side of the forming column ring 4 to the side of the auger 3. The grid drum 7 in this embodiment is easy manufactured and greatly effects the removal of laminations in the batches. As the section of the grid 9 is streamlined, resistance of the batch passing through the grid is much reduced. In the further embodiment shown in FIGS. *3a* and *3b*, a grid 9 of a grid drum 7 is formed by concentric circular grid members and radial grid members and is denser at its center. A section of the grid 9 is also streamline from the side of the forming columnar ring 4 to the side of the auger 3. In this embodiment, laminations apt to occur at a center of a ceramic batch are effectively removed at the denser center of the grid 9.

In carrying out the ceramic extruding method by the use of the apparatus constructed as above described, a prepared ceramic material is first supplied into the material supply opening 6. The ceramic material is kneaded in the vacuum kneading section consisting of the screw type mill 1 and the vacuum chamber 2. Thereafter, the kneaded ceramic material is transferred by the auger 3 into the grid drum in which the material is loosened and crushed. The loosened and crushed ceramic material is formed by the forming column ring 4 and the cutting machine 8 into a formed circular cylinder or columnar body having the diameter and the length enabling it to be inserted into the cylinder of the plunger molding machine. Finally, the formed columnar body is extruded by the conventional plunger molding machine to form a formed body having a predetermined shape.

As can be seen from the above description, according to the invention a ceramic batch kneaded and supplied for forming a ceramic body is loosened and crushed by means of the grid drum and then extruded by means of a plunger molding machine to form a formed body of a predetermined shape. Therefore, it is possible to prevent laminations which would occur in the formed circular columnar body to be supplied into the plunger molding machine, thereby preventing deformations of the formed body of the predetermined shape.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of forming a ceramic extrudate to be subsequently extruded into a formed ceramic body through a plunger molding machine, said method comprising:

supplying a ceramic material to a vacuum auger machine to form a ceramic batch;

transporting the ceramic batch through a batch transfer section of said vacuum auger machine;

loosening and crushing the transported ceramic batch through a grid member located at an exit of said batch transfer section to remove laminations in the ceramic batch; and extruding the loosened and crushed ceramic batch from the vacuum auger machine into a formed ceramic extrudate, which is of a size capable of being inserted into a cylinder of said plunger molding machine.

2. A method according to claim 1, wherein said formed ceramic body is a ceramic honeycomb structural body.

3. An apparatus for forming a ceramic extrudate to be subsequently extruded into a formed ceramic body through a plunger molding machine, said apparatus comprising of vacuum auger machine consisting essentially of:

a vacuum kneading section for kneading a ceramic material to produce a ceramic batch;

an extrudate body forming section for forming the kneaded ceramic batch into a formed extrudate body;

a batch transfer section having an auger for transferring the ceramic batch from said kneading section to said extrudate body forming section; and a grid drum having a grid provided on an exit side of said batch transfer section between said kneading section and said extrudate body forming section, such that said grid loosens and crushes the kneaded ceramic batch to remove laminations therefrom before said batch is transferred into said extrudate body forming section.

4. An apparatus according to claim 3, wherein said grid is honeycomb-shaped.

5. An apparatus according to claim 3, wherein said grid comprises concentric circular grid members interconnected by radial grid members.

6. An apparatus according to claim 3, wherein said grid is denser at a center thereof.

7. An apparatus for forming a ceramic extrudate to be subsequently extruded into a formed ceramic body through a plunger molding machine, said apparatus comprising a vacuum auger machine consisting essentially of:

a vacuum kneading section for kneading a ceramic material to produce a ceramic batch;

an extrudate body forming section for forming the kneaded ceramic batch into a formed extrudate body;

a batch transfer section having an auger for transferring the ceramic batch from said kneading section to said extrudate body forming section; and a grid drum having a grid provided on an exit side of said batch transfer section between said kneading section and said extrudate body forming section, such that said grid loosens and crushes the kneaded ceramic batch to remove laminations therefrom before said batch is transferred into said extrudate body forming section, said grid comprising a plurality of grid members, each having a cross-sectional shape which is streamlined in a sectional plane substantially perpendicular to a flowing direction of the ceramic batch.

* * * * *